(12) United States Patent
Ueno

(10) Patent No.: US 11,721,369 B2
(45) Date of Patent: Aug. 8, 2023

(54) ELECTRONIC DEVICE AND METHOD FOR CONTROLLING THE SAME

(71) Applicant: CANON KABUSHIKI KAISHA, Tokyo (JP)

(72) Inventor: Daiyu Ueno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/570,033

(22) Filed: Jan. 6, 2022

(65) Prior Publication Data

US 2022/0223184 A1 Jul. 14, 2022

(30) Foreign Application Priority Data

Jan. 13, 2021 (JP) .................................. 2021-003493

(51) Int. Cl.
  *H04N 5/77* (2006.01)
  *G11B 33/14* (2006.01)
  *H04N 23/63* (2023.01)
  *H04N 5/935* (2006.01)

(52) U.S. Cl.
  CPC ............ *G11B 33/144* (2013.01); *H04N 5/77* (2013.01); *H04N 23/634* (2023.01)

(58) Field of Classification Search
  CPC ... G11B 33/144; H04N 5/232941; H04N 5/77
  USPC ................ 386/224, 222, 206, 200, 248, 277
  See application file for complete search history.

(56) References Cited

U.S. PATENT DOCUMENTS

2021/0279006 A1* 9/2021 Fujimori ............... G06F 3/0632

FOREIGN PATENT DOCUMENTS

| JP | 2004178683 A | * | 6/2004 |
| JP | 2007028425 A |   | 2/2007 |
| JP | 4066317 B2   | * | 3/2008 |

* cited by examiner

*Primary Examiner* — Christopher Braniff
(74) *Attorney, Agent, or Firm* — Canon U.S.A., Inc. IP Division

(57) ABSTRACT

An electronic device comprising at least one memory and at least one processor which function as, a temperature acquisition unit configured to acquire a temperature of a recording medium attached to the electronic device, a setting unit configured to set at least one of settings including a first setting and a second setting, and a control unit configured to perform control, in a case where the first setting is set, and when a predetermined condition regarding a rise in the temperature of the recording medium is satisfied, to restrict at least a particular operation requiring a writing speed to the recording medium at a predetermined speed or higher, and in a case where the second setting is set, not to restrict the particular operation even when the predetermined condition is satisfied.

24 Claims, 7 Drawing Sheets

ELECTRONIC DEVICE AND METHOD FOR CONTROLLING THE SAME

BACKGROUND

Field

The present disclosure relates to an electronic device for controlling restrictions on operations relating to heat in an imaging apparatus capable of recording a moving image, and a method for controlling the same.

Description of the Related Art

In recent years, many imaging apparatuses, such as digital cameras, capable of recording a moving image are on the market. During moving image recording using such an imaging apparatus, heat is generated in various members inside the imaging apparatus. For safety of users and to prevent effects of generated heat on the imaging apparatus and its image quality, taking countermeasures against generated heat becomes an important issue. Specifically, due to growing speed of writing in to recording media, such as a memory card inserted in and attached to an imaging apparatus, and an improvement in recording media in terms of recordable image quality of moving images, a temperature rise on a surface of a recording medium may occur. Consequently, there is a possibility that a user gets burned when taking out a recording medium from an imaging apparatus. Japanese Patent Application Laid-Open No. 2007-28425 discusses a technique in which temperature of a camera is measured, and in a case where the measured temperature reaches a high temperature, the camera prohibits a moving image mode that consumes high power and switches the operation mode to a still image mode that consumes low power.

According to Japanese Patent Application Laid-Open No. 2007-28425, however, in a case where recording of a high image quality moving image is performed, a temperature of the recording medium reaches a high temperature in a short time by the writing to record the moving image in a recording medium, which causes a failure of moving image recording in the moving image mode. On the other hand, if the moving image recording is continued even in a case where the temperature of the recording medium reaches a high temperature, there is a possibility that, when a user takes out the recording medium from the camera, the user may be surprised by heat and drop the recording medium or get burned.

SUMMARY OF THE DISCLOSURE

According to an aspect of the present disclosure, an electronic device comprising at least one memory and at least one processor which function as, a temperature acquisition unit configured to acquire a temperature of a recording medium used in the electronic device, a setting unit configured to set at least one of settings including a first setting and a second setting, and a control unit configured to perform control, in a case where the first setting is set, and when a predetermined condition regarding a rise in the temperature of the recording medium is satisfied, to restrict at least a particular operation requiring a writing speed to the recording medium at a predetermined speed or higher, and in a case where the second setting is set, not to restrict the particular operation even when the predetermined condition is satisfied.

Further features of the present disclosure will become apparent from the following description of example embodiments with reference to the attached drawings.

DESCRIPTION OF THE EMBODIMENTS

With reference to the drawings, suitable example embodiments of the present disclosure will be described below.

<External View of Digital Camera 100>

Figure 1A:
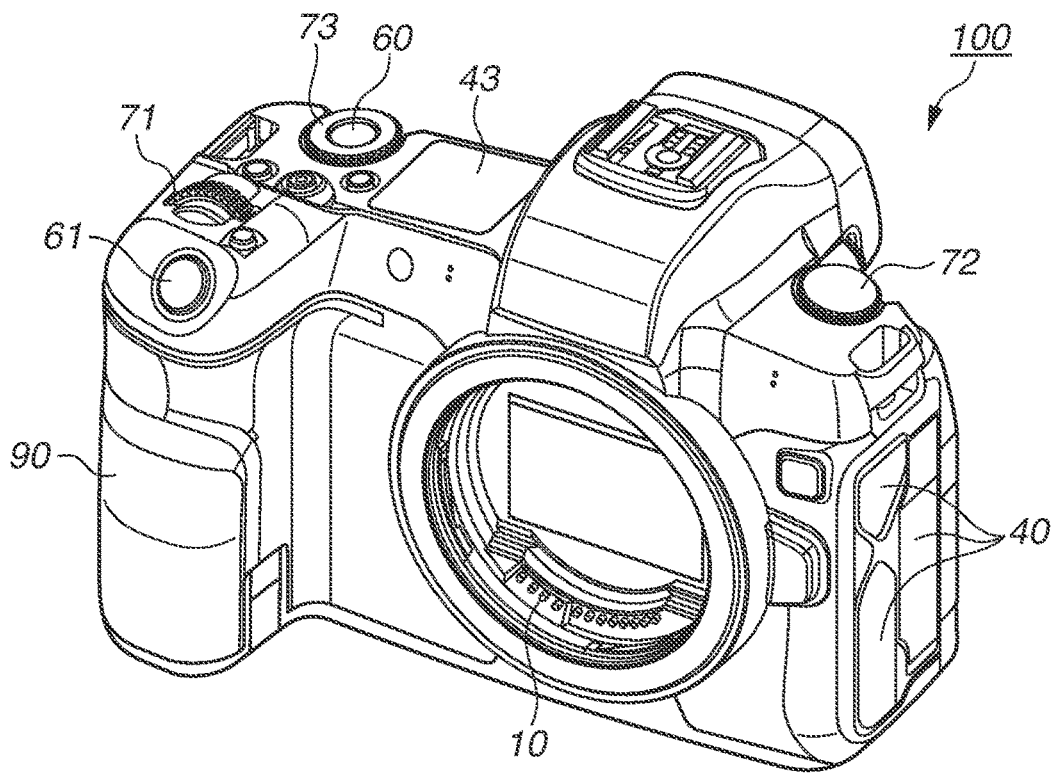
FIGS. 1A and 1B are diagrams illustrating external views of a digital camera.
Figure 1B:
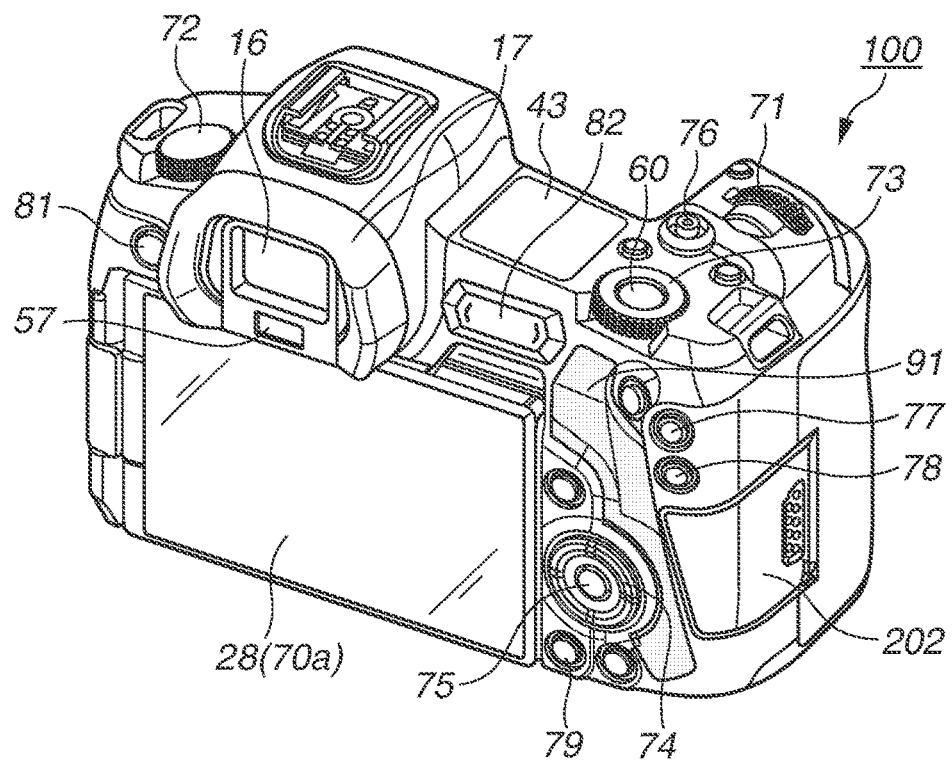

FIGS. 1A and 1B illustrate external views of a digital camera 100 as an example of an electronic device that serves as an apparatus to which the present disclosure is applicable. FIG. 1A is a front perspective view of the digital camera 100. FIG. 1B is a rear perspective view of the digital camera 100. A display unit 28 in FIG. 1B provided on a back surface of the digital camera 100 displays an image and various pieces of information. A touch panel 70a is a touch operation member and can detect a touch operation performed on a display surface as an operation surface of the display unit 28. An outside-viewfinder display unit 43 is a display unit provided on an upper surface of the digital camera 100 and displays various setting values of the digital camera 100, such as setting values including a shutter speed and an aperture.

A shutter button 61 is an operation unit for issuing an image capturing instruction. A mode selection switch 60 is an operation unit for switching various modes. A terminal cover 40 is a cover that protects a connector (not illustrated) for connecting between the digital camera 100 and a connection cable connecting with an external device.

A main electronic dial 71 is a rotary operation member included in an operation unit 70. The main electronic dial 71 is rotated, to change setting values including a shutter speed and an aperture. A power switch 72 is an operation member for switching on and off of the power of the digital camera 100.

A sub electronic dial 73 is a rotary operation member included in the operation unit 70 and is used to move a selection frame or advance images. A directional pad 74 is an operation member included in the operation unit 70 and including a push button that can be pushed in in four directions. The directional pad 74 is used for an operation corresponding to a direction in which the directional pad 74 is pressed.

A SET button 75 is a push button included in the operation unit 70 and is mainly used to determine a setting item.

A moving image button 76 is used to issue an instruction to start and stop recording of a moving image. An automatic exposure (AE) lock button 77 is included in the operation unit 70 and in a case where the AE lock button 77 is pressed in an image capturing standby state, an exposure state can be fixed. An enlargement button 78 is an operation button included in the operation unit 70 and is used to turn on and off an enlargement mode in live view display in an image capturing mode. A live view image can be enlarged and reduced by operations on the main electronic dial 71 after turning on the enlargement mode. In a reproduction mode, the enlargement button 78 functions as an enlargement button for enlarging a reproduction image and increasing an enlargement ratio. A reproduction button 79 is an operation button included in the operation unit 70 and is used to switch a mode of the digital camera 100 between the image capturing mode and the reproduction mode. In a case where the reproduction button 79 is pressed in the image capturing mode, the mode of the digital camera 100 transitions to the reproduction mode from the image capturing mode, and the latest image among images recorded in a recording medium 200 can be displayed on the display unit 28. A menu button 81 is included in the operation unit 70 and is pressed to display a menu screen on the display unit 28 on which various settings can be performed. A user can intuitively perform various settings using the menu screen displayed on the display unit 28, the directional pad 74, and the SET button 75.

A touch bar 82 which is a multifunction (M-Fn) bar is a line-shaped operation member as a line touch sensor capable of receiving a touch operation. The touch bar 82 is disposed at a position where a user can perform a touch operation on the touch bar 82, i.e., can touch the touch bar 82 with a right thumb in a state where the user grips a grip portion 90 with the right hand so that the user can press the shutter button 61 with the right index finger in a state where the user grips the grip portion 90 with the right little finger, the ring finger, and the middle finger. That is, the touch bar 82 is disposed at a position where the user can operate the touch bar 82 in an image capturing orientation which is a state where the user looks into a viewfinder with an eye in proximity to an eyepiece portion 16 and holds the digital camera 100 to be ready for pressing the shutter button 61 at any time. The touch bar 82 is a reception unit capable of receiving a tap operation on the touch bar 82, which is an operation of touching the touch bar 82 with a finger and separating the finger from the touch bar 82 without moving the finger within a predetermined period, and a slide operation to the left and right, which is an operation of touching the touch bar 82 with a finger and then moving the finger touching position while keeping the finger touched on the touch bar 82. The touch bar 82 is an operation member different from the touch panel 70a, and does not have a display function.

A communication terminal 10 is a communication terminal for the digital camera 100 to communicate with a lens unit 150 (described below) which is detachable from the digital camera 100. The eyepiece portion 16 is an eyepiece portion of an eyepiece viewfinder 17 as a look-in type viewfinder. The user can visually check a video displayed on an electronic viewfinder (EVF) 29 disposed inside the eyepiece viewfinder 17 through the eyepiece portion 16. An eye proximity unit 57 is an eye proximity detection sensor that detects whether an eye of a user (a photographer) is in proximity to the eyepiece portion 16. A cover 202 is a cover of a slot in which the recording medium 200 (described below) is stored. The grip portion 90 is a holding portion having a shape allowing a user to easily grip the holding portion with the right hand when a user holds the digital camera 100. The shutter button 61 and the main electronic dial 71 are disposed at positions where a user can operate the shutter button 61 and the main electronic dial 71 with the right index finger in a state where the user holds the digital camera 100 by gripping the grip portion 90 with the right little finger, the ring finger, and the middle finger. The sub electronic dial 73 and the touch bar 82 are disposed at positions where a user can operate the sub electronic dial 73 and the touch bar 82 with the right thumb in the above-described state. A thumb rest portion 91 as a thumb standby position is a grip member provided at a place on the back surface of the digital camera 100 where a user can easily place the thumb of the right hand gripping the grip portion 90 in a state where the user does not operate any of the operation members. The thumb rest portion 91 is made of a rubber member for enhancing a holding force including a grip feeling.

<Configuration Block Diagram of Digital Camera 100>

Figure 2:
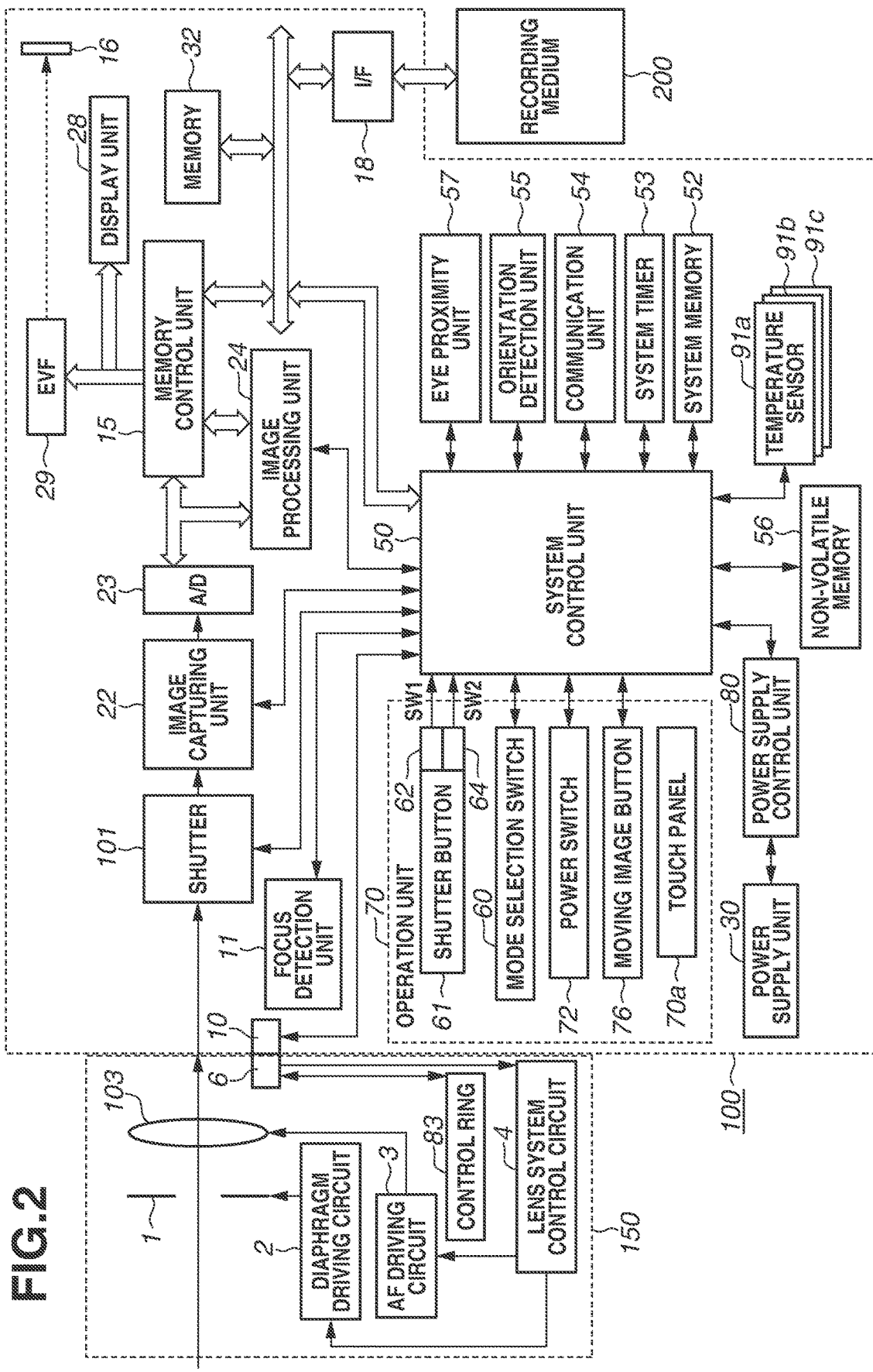
FIG. 2 is a schematic block diagram illustrating an example of a hardware configuration of the digital camera.

FIG. 2 is a block diagram illustrating an example of the configuration of the digital camera 100 according to the present example embodiment. In FIG. 2, the lens unit 150 is a lens unit on which an interchangeable imaging lens is mounted. While a lens 103 normally includes a plurality of lenses, FIG. 2 illustrates a single lens for convenience of explanation. A communication terminal 6 is a communication terminal for the lens unit 150 to communicate with the digital camera 100. The lens unit 150 communicates with a system control unit 50 via the communication terminals 6 and 10 and causes a lens system control circuit 4 provided inside the lens unit 150 to control a diaphragm 1 via a diaphragm driving circuit 2. Then, the lens unit 150 displaces the lens 103 via an autofocus (AF) driving circuit 3, to adjust the focus of the lens 103.

A shutter 101 is a focal-plane shutter capable of freely controlling an exposure time of an image capturing unit 22 by control of the system control unit 50.

The image capturing unit 22 is an image sensor including a charge-coupled device (CCD) sensor or a complementary metal-oxide-semiconductor (CMOS) sensor, which converts an optical image into an electric signal. The image capturing unit 22 may include an imaging plane phase difference sensor that outputs amount-of-defocus information to the system control unit 50. An analog-to-digital (A/D) converter 23 converts an analog signal output from the image capturing unit 22 into a digital signal.

An image processing unit 24 performs predetermined processes, such as pixel interpolation, a resizing process including reduction, and a color conversion process, on data from the A/D converter 23 or data from a memory control unit 15. The image processing unit 24 performs a predetermined calculation process using captured image data. The system control unit 50 performs exposure control and distance measurement control based on the calculation result obtained by the image processing unit 24. Based on the above described control, an AF process, an AE process, and a pre-flash (EF) process are performed by a through-the-lens (TTL) method. Further, the image processing unit 24 performs a predetermined calculation process using captured image data and performs an auto white balance (AWB) process by the TTL method based on the obtained calculation result.

The memory control unit 15 controls transmission and reception of data between the A/D converter 23, the image processing unit 24, and a memory 32. Output data from the A/D converter 23 is written directly to the memory 32 via the image processing unit 24 and the memory control unit 15 or via the memory control unit 15. The memory 32 stores image data obtained by the image capturing unit 22 and converted into digital data by the A/D converter 23 and image data to be displayed on the display unit 28 or the EVF 29. The memory 32 has a sufficient storage capacity for storing a predetermined number of still images and a moving image and a sound of a predetermined length of time.

The memory 32 also serves as a memory for image display (a video memory). Image data for use in display written in the memory 32 is displayed on the display unit 28 and the EVF 29 via the memory control unit 15. The display unit 28 and the EVF 29 perform display on a display device, such as a liquid crystal display (LCD) or an organic electroluminescent (EL) display, according to a signal from the memory control unit 15. Image data is converted from analogue data to digital data by the A/D converter 23, and the digital data is accumulated in the memory 32 and sequentially transferred to and displayed on the display unit 28 or the EVF 29, whereby the display unit 28 or the EVF 29 can perform live view display (LV display). Hereinafter, an image displayed in live view will be referred to as a "live view image (LV image)".

The outside-viewfinder display unit 43 displays various setting values of the digital camera 100, such as setting values of a shutter speed, an aperture, and the like, via an outside-viewfinder display unit driving circuit.

A non-volatile memory 56 is an electrically erasable and recordable memory. As the non-volatile memory 56, for example, a flash read-only memory (ROM) is used. The non-volatile memory 56 stores constants for operation of the system control unit 50 and a program. The "program" as used herein refers to a program for executing various procedures of flowcharts described below in the present example embodiment.

The system control unit 50 is a control unit including at least one processor or circuit and controls the entire digital camera 100. The system control unit 50 executes the above-described program recorded in the non-volatile memory 56, to achieve processes described later in the present example embodiment. As a system memory 52, for example, a random-access memory (RAM) is used. Constants and variables for operation of the system control unit 50 and a program read from the non-volatile memory 56 are loaded into the system memory 52. The system control unit 50 also controls the memory 32 and the display unit 28, to perform display control.

A system timer 53 is a time measurement unit that measures a time to be used for various types of control and the time of a built-in clock.

The operation unit 70 including the mode selection switch 60, a first shutter switch 62, and a second shutter switch 64 is an operation unit for inputting various operation instructions to the system control unit 50.

The mode selection switch 60 is used to switch an operation mode of the system control unit 50 between a still image capturing mode and a moving image recording mode. The still image capturing mode includes an auto image capturing mode, an auto scene recognition mode, a manual mode, a stop priority mode (an Av mode), a shutter speed priority mode (a Tv mode), and a program AE mode (a P mode). The still image capturing mode also includes various scene modes in which image capturing settings are set according to image capturing scenes, and a custom mode. Using the mode selection switch 60, a user can directly switch the operation mode to any one of these modes. Alternatively, the user may once display a list screen of image capturing modes by using the mode selection switch 60, then select any one of a plurality of modes displayed on the list screen to switch the operation mode to the selected mode using a different operation member. Similar to the still image capturing mode, the moving image recording mode may also include a plurality of modes.

The first shutter switch 62 is turned on in an intermediate state of an operation performed on the shutter button 61 provided in the digital camera 100, i.e., by a so-called half press as an image capturing preparation instruction, and generates a first shutter switch signal SW1. In response to the first shutter switch signal SW1, the system control unit 50 starts an image capturing preparation operation, such as an AF process, an AE process, an AWB process, and an EF process.

The second shutter switch 64 is turned on by completion of an operation performed on the shutter button 61, i.e., by a so-called full press as an image capturing instruction, and generates a second shutter switch signal SW2. Alternatively, a touch operation is performed on an item which is displayed on the display unit 28 and has a function of issuing an image capturing instruction, whereby the second shutter switch signal SW2 is generated. In response to the second shutter switch signal SW2, the system control unit 50 starts a series of operations of an image capturing process from reading a signal from the image capturing unit 22 to writing a captured image as an image file to the recording medium 200.

The operation unit 70 is various operation members as an input unit that receives operations from the user.

The operation unit 70 at least includes operation members, such as the shutter button 61, the touch panel 70a, the main electronic dial 71, the power switch 72, the sub electronic dial 73, the directional pad 74, the SET button 75, the moving image button 76, the AE lock button 77, the enlargement button 78, the reproduction button 79, and the menu button 81.

A power supply control unit 80 includes a battery detection circuit, a direct-current-to-direct-current (DC/DC) converter, a switch circuit for switching blocks to which a current is applied, and the like. The power supply control unit 80 detects presence or absence of attachment of a battery, a type of the battery, and a remaining life of the battery. The power supply control unit 80 controls the DC/DC converter based on the detection results and an instruction from the system control unit 50 and supplies a required voltage to the components including the recording medium 200 for a required period. A power supply unit 30 includes a primary battery, such as an alkaline battery and a lithium battery, a secondary battery, such as a nickel-cadmium (NiCd) battery, a nickel-metal hydrate (NiMH) battery, or a lithium-ion (Li) battery, and an alternating current (AC) adapter.

A recording medium interface (recording medium I/F) 18 is an interface with the recording medium 200, such as a memory card or a hard disk. The recording medium 200 is a recording medium, such as a memory card, for recording a captured image and includes a semiconductor memory or a magnetic disk. To the recording medium I/F 18, various memory cards (described below) can be attached. From a memory card attached to the recording medium I/F 18, the recording medium I/F 18 can obtain various pieces of information, such as a temperature and an environment inside the card and a writing speed.

A communication unit 54 connects to an external device wirelessly or via a cable for a wired connection, and transmits and receives a video signal and a sound signal to and from the external device. The communication unit 54 can also connect to a wireless local area network (LAN) or the Internet. The communication unit 54 can communicate with the external device also using Bluetooth® or Bluetooth® Low Energy. The communication unit 54 can transmit an image including a live view image captured by the image capturing unit 22 or an image stored in the recording medium 200 to the external device and also receive an image or various other pieces of information from the external device.

An orientation detection unit 55 detects orientation of the digital camera 100 relative to the direction of gravity. Based on the orientation detected by the orientation detection unit 55, the system control unit 50 can determine whether an image captured by the image capturing unit 22 is an image captured with the digital camera 100 held horizontally or an image captured with the digital camera 100 held vertically. The system control unit 50 can add direction information according to the orientation detected by the orientation detection unit 55 to an image file of an image captured by the image capturing unit 22 or store the image by rotating the image based on the orientation detected by the orientation detection unit 55. As the orientation detection unit 55, an acceleration sensor or a gyro sensor can be used. Using the acceleration sensor or the gyro sensor as the orientation detection unit 55, the system control unit 50 can also detect motion of the digital camera 100, i.e., detect whether the digital camera 100 is panned, tilted, lifted, or at rest.

The eye proximity unit 57 is an eye proximity detection sensor that performs approach detection to detect an approach (eye proximity) and a separation (eye separation) of an eye (an object) 161 to and from the eyepiece portion 16 of the viewfinder. As the eye proximity unit 57, for example, an infrared proximity sensor can be used. The eye proximity unit 57 can detect an approach of some kind of object to the eyepiece portion 16 of the viewfinder having the EVF 29 built-in. In a case where an object approaches, infrared light projected from a light projection portion (not illustrated) of the eye proximity unit 57 is reflected on the object. Then, the reflected infrared light is received by a light reception portion (not illustrated) of the infrared proximity sensor. According to the amount of the received infrared light, it is also possible to determine a distance from the eyepiece portion 16 to the object (an eye proximity distance). As described above, the eye proximity unit 57 performs eye proximity detection for detecting a distance from an object approaching the eyepiece portion 16. In a non-eye proximity state (a non-approach state), in a case where an object approaching the eyepiece portion 16 within a predetermined distance from the eyepiece portion 16 is detected, it is detected that an eye is in proximity. In an eye proximity state (an approach state), in a case where an object of which approach has been detected separates from the eyepiece portion 16 at a predetermined distance or more, it is detected that the eye separates. A threshold for detecting eye proximity and a threshold for detecting eye separation may be different from each other, for example, based on hysteresis. After eye proximity is detected, the eye proximity state continues until eye separation is detected. After eye separation is detected, the non-eye proximity state continues until eye proximity is detected. The infrared proximity sensor is merely an example, and a different sensor may be employed as the eye proximity unit 57 as long as the sensor can detect an approach of an eye or an object that can be regarded as eye proximity.

Figure 6:
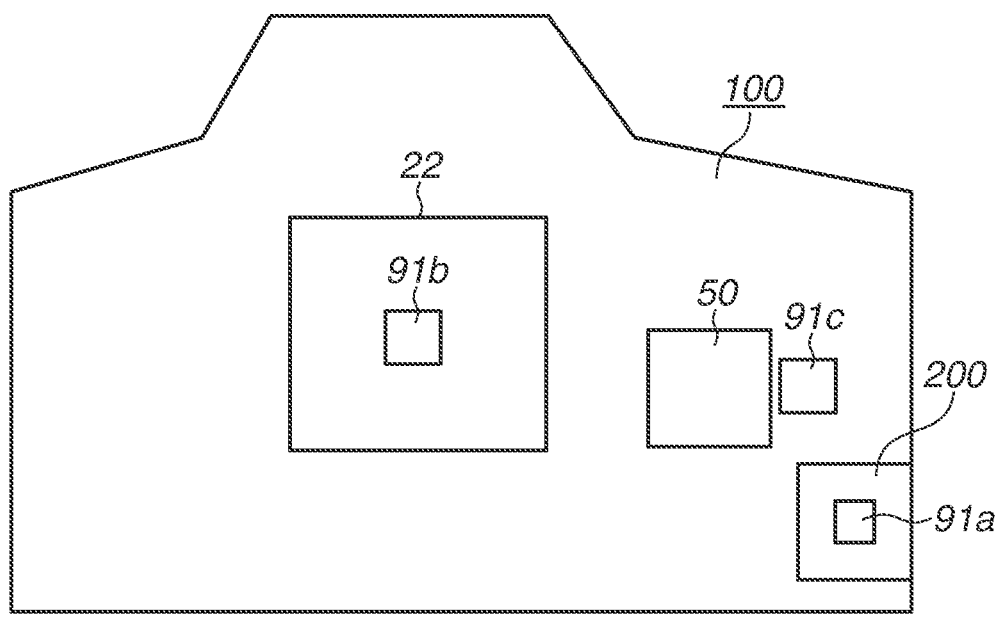
FIG. 6 is a diagram illustrating placements of temperature sensors of the digital camera.

Temperature sensors 91a, 91b, and 91c are temperature sensors that measure and acquire temperatures of the digital camera 100. FIG. 6 illustrates examples of placement positions of the temperature sensors 91a, 91b, and 91c. FIG. 6 is a diagram illustrating the digital camera 100 viewed from the display unit 28 side in the orientation where the EVF 29 is on the top of the digital camera 100. The temperature sensor 91a is a temperature sensor disposed near an insertion opening (an attachment opening) of the recording medium 200 protected by the cover 202 and measures a temperature for calculating a surface temperature of an exterior of the recording medium 200 inserted in and attached to the digital camera 100. The temperature sensor 91a is provided to avoid a situation where the surface temperature of the exterior of the recording medium 200 reaches a high temperature, and thus it prevents the user from getting burned when opening the cover 202 and taking the recording medium 200 out of the digital camera 100. The temperature sensor 91b is a temperature sensor disposed near the image capturing unit 22, and the temperature sensor 91c is a temperature sensor disposed near the system control unit 50. The temperature sensors 91b and 91c measure temperatures near the respective devices. In a case where a temperature of each device reaches a high temperature, e.g., 80° C. or higher, the device may not normally function, and image quality may deteriorate. To prevent these phenomena, the temperature sensors 91b and 91c measure the temperatures. Although not illustrated in FIG. 6, some types of the recording medium 200 may include a temperature sensor inside and measure its temperature. Such a temperature sensor inside the recording medium 200 may be used instead of the temperature sensor 91a. The number of sensors and the placement positions of sensors described in the present example embodiment, however, are not limited to these.

Specific examples of settings related to moving image recording includes a moving image recording image quality, a moving image recording format, a frame rate, and a compression method. The moving image recording image quality refers to the number of recording pixels (the recording size), such as full high definition (FHD) of 1920 horizontal pixels×1080 vertical pixels, 4K of 3840 horizontal pixels×2160 vertical pixels, or 8K of 7680 horizontal pixels×4420 vertical pixels. The moving image recording format is a file format for recording a moving image. In moving image recording, either of a raw format and a Moving Picture Experts Group (MPEG)-4 Part 14 (MP4) format can be selected. In the raw format, data output from an image sensor is digitally converted and recorded without being subjected to a raw development process. In the MP4 format, data output from an image sensor is subjected to a raw development process, and further, is compressed by the image processing unit 24 according to a compression method setting, and recorded. The higher the moving image recording image quality is, the more load is applied to processing of the image capturing unit 22, and the more likely heat is to be generated. That is, the temperature measured by the temperature sensor 91b is likely to rise. In a case where a moving image recording format is the raw format, data is not compressed, and therefore, a load is not applied to the image processing unit 24. However, since the data is uncompressed raw data, the amount of data increases. Thus, the data needs to be written to the recording medium 200 at a high speed, a load is applied to the recording medium 200, and heat is likely to be generated. That is, communication between the digital camera 100 and the recording medium 200 consumes much power, and the temperature measured by the temperature sensor 91a is likely to rise. In a case where a moving image recording format is the MP4 format, data is compressed, and thus, a load is applied to the image processing unit 24, and heat is likely to be generated at the image processing unit 24.

However, since the data is compressed, the amount of data is reduced to some extent. Thus, a load is less likely to be applied to the recording medium 200 when the data is recorded in the recording medium 200. That is, the temperature measured by the temperature sensor 91a is less likely to rise.

The frame rate, in other words, frames per second or frames/second (fps), refers to the number of frames recorded or reproduced per second. Examples of the frame rate include 120 fps, 60 fps, and 30 fps. The larger the number is, the smoother moving image can be recorded. Depending on the country or the region, the frame rate may be 119.9 fps, 59.94 fps, or 29.97 fps, which is greater than 119 fps, 59 fps, or 29 fps, respectively. The compression method is a method for compressing a recorded image. Examples of the compression method include an ALL-I method for performing compression in units of one frame, and an IPB method for performing compression in units of a plurality of frames. The compression strength of the IPB method is greater than the compression strength of the ALL-I method, and a file size generated using the IPB method is smaller than a file size generated using the ALL-I method (the ALL-I method>the IPB method). In a case where either of the compression methods is selected, an image is recorded as a moving image file in an MP4 format.

A memory card as an example of the recording medium 200 has various types (standards). Examples of the memory card include a Secure Digital eXtended Capacity (SDXC) memory card, an XQD memory card, a CompactFast (CFast) card, and a CFexpress (CFX) card. A standard is set for each type of card, and the card requires a card reader compatible with the card. The maximum transfer speed differs based on each standard. Although there are slight differences depending on the manufacturers or the series, the cards roughly have the following maximum transfer speeds defined in the respective standards.

SDXC (registered trademark) memory card (video speed class V90): about 90 MB/second XQD (registered trademark) memory card: about 440 MB/second CFast (registered trademark) card: about 600 MB/second CFexpress (registered trademark) card Type B: about 2000 MB/second The faster the transfer speed is, the shorter time it takes to transfer and write a still image or a moving image having high image quality or a large amount of data to the memory card. For example, even when still images having high image quality are continuously captured, or a moving image having high image quality is recorded, since the transfer speed is high, the image capturing or the recording does not stop due to buffer full. This can reduce inconvenience for the user. "Buffer full" refers to a state where the memory 32, which is a work memory for continually recording still images or a moving image, does not have sufficient free space and cannot record still images or a moving image.

Figure 3:
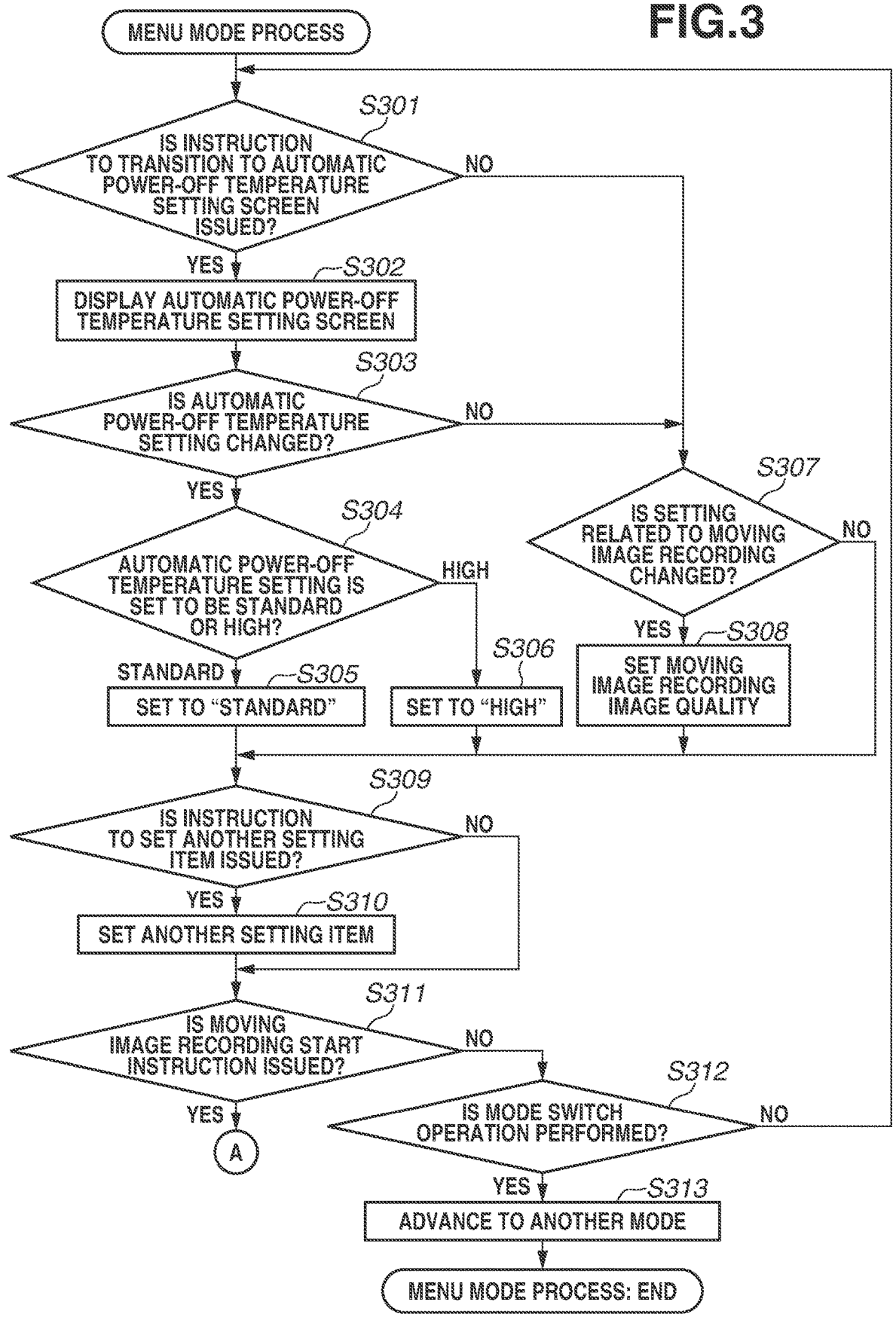
FIG. 3 is a flowchart illustrating control regarding settings related to an automatic power-off temperature in a menu mode.

FIG. 3 is a control flowchart regarding the settings related to moving image recording in a menu mode process according to the present example embodiment. This control process according to the present example embodiment is achieved in such a manner that the digital camera 100 loadings a program recorded in the non-volatile memory 56 into the system memory 52, and the system control unit 50 executes the program. The flowchart for the control process in FIG. 3 is started when the digital camera 100 is powered on, and the menu button 81 is pressed.

Figure 5A:
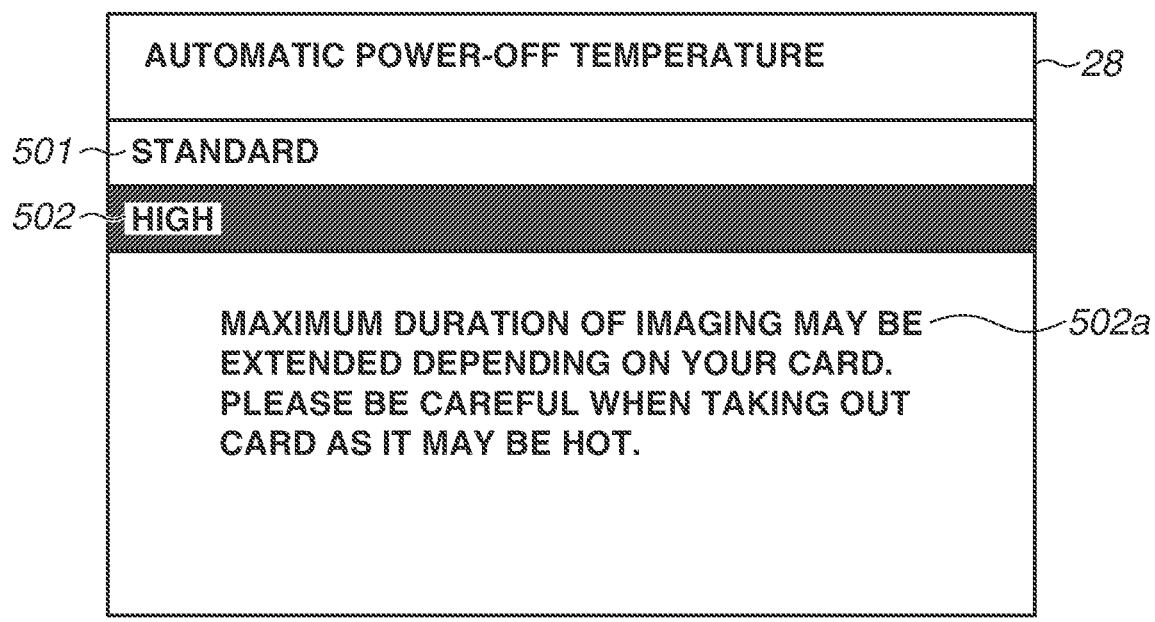
FIG. 5A is a diagram illustrating an example of display of an automatic power-off temperature setting screen in a setting menu screen.

FIG. 5A illustrates an example of display of a setting menu screen. In a case where a page of an automatic power-off temperature setting in the setting menu screen is selected, the display illustrated in FIG. 5A is performed on the display unit 28, in other words, the display on the display unit 28 transitions to a page on a hierarchical level below the automatic power-off temperature setting, and setting items 501 and 502 are displayed.

In a case where the user selects the setting item 501, an automatic power-off temperature is set to "standard". In a case where a temperature measured by the temperature sensor 91a illustrated in FIG. 6 reaches a predetermined temperature, which is 70° C. in the present example embodiment, the digital camera 100 is powered off. In a case where the user selects the setting item 502, the digital camera 100 is not powered off even in a case where the temperature measured by the temperature sensor 91a illustrated in FIG. 6 reaches the predetermined temperature. FIG. 5A illustrates the state where a cursor is displayed at the setting item 502. In this state, a message 502a alerts the user that if the setting item 502 is set, the surface temperature of the recording medium 200 may rise. In the present example embodiment, whether to power off the digital camera 100 is controlled according to a condition that the temperature measured by the temperature sensor 91a reaches the predetermined temperature (a temperature limit). The condition, however, is not limited to this. As will be described below in step S304, whether to power off the digital camera 100 can also be controlled by using the type of the recording medium 200 (the memory card) inserted in the digital camera 100 or setting contents related to a moving image as a condition.

In step S301, the system control unit 50 determines whether a transition instruction to transition to the automatic power-off temperature setting screen is issued. In a case where the transition instruction is issued (YES in step S301), the processing proceeds to step S302. In a case where the transition instruction is not issued (NO in step S301), the processing proceeds to step S307.

In step S302, the system control unit 50 displays the automatic power-off temperature setting screen on the display unit 28. FIG. 5A illustrates an example of the display displayed in this process.

In step S303, the system control unit 50 determines whether the automatic power-off temperature setting is changed. In a case where the setting is changed (YES in step S303), the processing proceeds to step S304. In a case where the setting is not changed (NO in step S303), the processing proceeds to step S307.

In step S304, the system control unit 50 determines the content of the change in the automatic power-off temperature setting. In a case where the setting is changed to "standard", the processing proceeds to step S305. In a case where the setting is changed to "high", the processing proceeds to step S306. In an initial setting of the digital camera 100, which is a setting set before shipment from the factory, the automatic power-off temperature is set to "standard". In this step, control is performed to allow the user to optionally set the automatic power-off temperature to either of "standard" and "high". Note, however, that the present invention is not limited to this configuration. In other embodiments, the setting can also be changed according to the memory card serving as the recording medium 200 inserted in and attached to the digital camera 100. For example, in a case where a CFexpress card is inserted, the automatic power-off temperature may be set to 90° C. In a case where an XQD card is inserted, the automatic power-off temperature may be set to 60° C. The setting can also be changed in accordance with settings related to moving image recording set by the user. For example, in a case where a moving image recording format is set to the raw format, or moving image recording image quality is set to 8K, the automatic power-off temperature setting may be set to "high". In a case where a moving image recording format is set to the MP4 format, or moving image recording image quality is set to 4K or FHD, the automatic power-off temperature setting may be set to "standard". In a case where a remaining life of the battery or a remaining capacity of the recording medium 200 is low, the automatic power-off temperature setting may be set to "standard". In a case where a remaining life of the battery and a remaining capacity of the recording medium 200 are sufficient, the automatic power-off temperature setting may be set to "high".

In step S305, the system control unit 50 sets the automatic power-off temperature setting to "standard" and saves the automatic power-off temperature setting in the non-volatile memory 56.

In step S306, the system control unit 50 sets the automatic power-off temperature setting to "high" and saves the automatic power-off temperature setting in the non-volatile memory 56.

In step S307, since the determination is NO in step S301 or S303, the system control unit 50 determines whether the settings related to moving image recording are changed. In a case where the settings are changed (YES in step S307), the processing proceeds to step S308. In a case where the settings are not changed (NO in step S307), the processing proceeds to step S309. In this process, settings related to a rise in the temperature measured by the temperature sensor 91*a* are targets of the checking. Thus, the system control unit 50 checks whether the settings of the moving image recording format is changed. While the moving image recording format is the checking target in the present example embodiment, the moving image recording image quality may also be checked. Even in a case where the moving image recording format is set to the raw format, the temperature of the recording medium 200 which is the temperature measured by the temperature sensor 91*a* may be less likely to rise with a setting in which the moving image recording image quality is set to FHD. On the other hand, even in a case where the moving image recording format is set to the MP4 format, the temperature of the recording medium 200 may be likely to rise with a setting in which the moving image recording image quality is set to high image quality, such as 4K or 8K. In addition to these settings, in a case where settings that cause a rise in the temperature of the recording medium 200 are included in the digital camera 100, the system control unit 50 can also check whether the settings are changed.

In step S308, the system control unit 50 performs settings according to the changes in the settings related to moving image recording and saves the settings in the non-volatile memory 56.

In step S309, the system control unit 50 determines whether a setting instruction to set another setting item is issued. In a case where the setting instruction is issued (YES in step S309), the processing proceeds to step S310. In a case where the setting instruction is not issued (NO in step S309), the processing proceeds to step S311. Another setting item is, for example, an item regarding an AF method for a still image.

In step S310, the system control unit 50 changes the setting for which the setting instruction is issued in step S309, and saves the setting in the non-volatile memory 56.

In step S311, the system control unit 50 determines whether a moving image recording start instruction is issued.

Figure 4A:
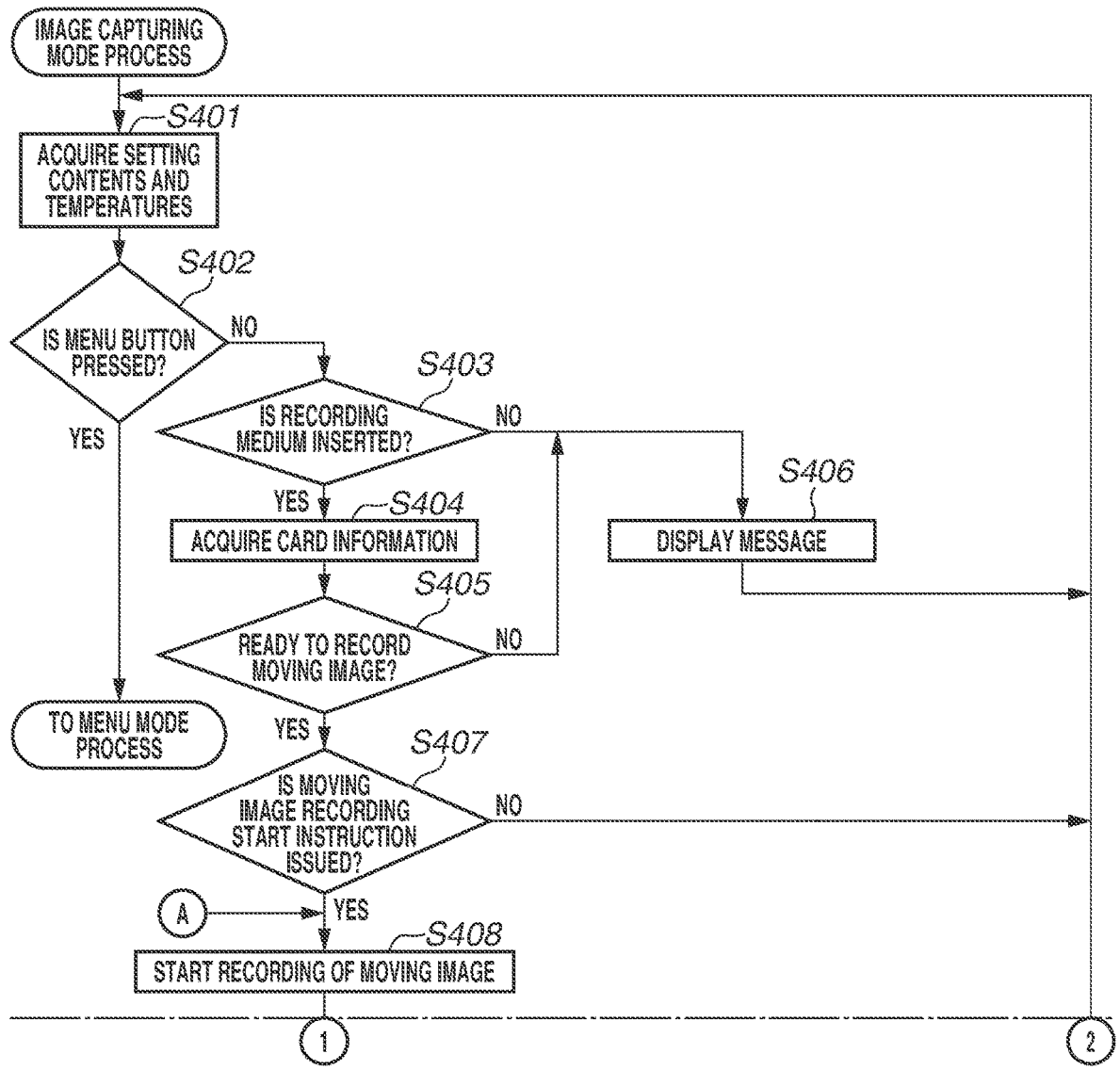
FIGS. 4A and 4B are diagrams illustrating a flowchart of control regarding the automatic power-off temperature in an image capturing mode process in a moving image mode.

In a case where the start instruction is issued (YES in step S311), the processing proceeds to step S408 in FIG. 4A. In a case where the start instruction is not issued (NO in step S311), the processing proceeds to step S312. Specifically, the moving image recording start instruction refers to pressing of the moving image button 76, or a touch on a touch button which is included in an apparatus capable of performing remote control and is for issuing an instruction to start moving image recording. In the present example embodiment, in a case where the shutter button 61 is pressed, the moving image recording mode transitions to the still image capturing mode. Alternatively, in a case where the moving image recording start instruction can be issued by pressing the shutter button 61, recording of a moving image may be started in response to the pressing of the shutter button 61.

In step S312, the system control unit 50 determines whether a mode switch operation is performed. In a case where the mode switch operation is performed (YES in step S312), the processing proceeds to step S313. In a case where the mode switch operation is not performed (NO in step S312), the processing returns to step S301. The mode switch operation refers to pressing of the reproduction button 79 or the shutter button 61. For example, in a case where the reproduction button 79 is pressed, the system control unit 50 advances to the reproduction mode process for reproducing a captured image. In a case where the shutter button 61 is pressed, the system control unit 50 advances to an image capturing mode process in a still image standby state. In a case where the moving image button 76 is pressed, the system control unit 50 advances to an image capturing mode process in a moving image standby state and starts moving image recording.

In step S313, the system control unit 50 advances to the mode process corresponding to the operation member operated in step S312 and ends the menu mode.

Figure 4B:
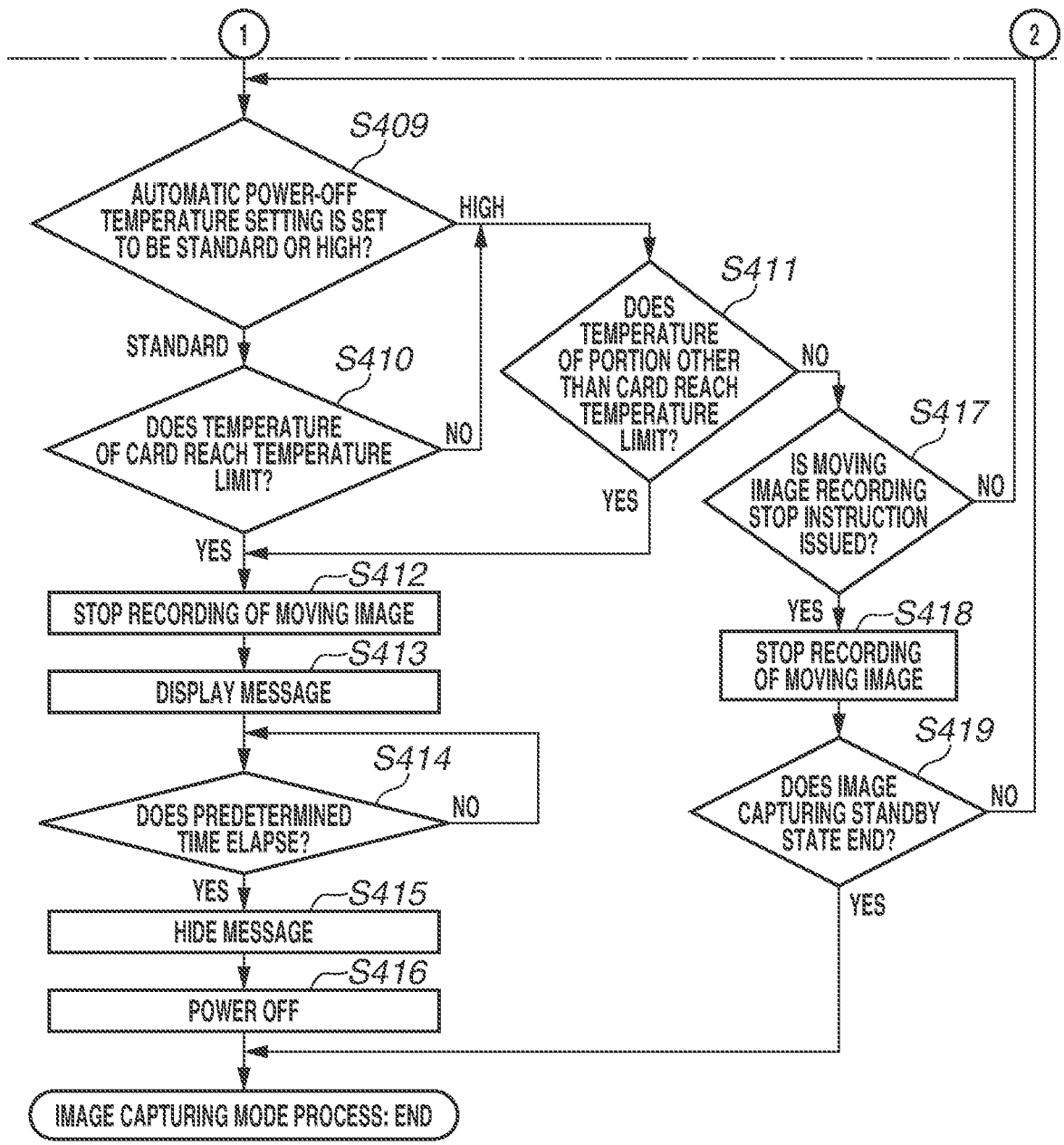

FIGS. 4A and 4B are a flowchart for a control process regarding a temperature of the digital camera 100 and moving image recording according to the present example embodiment. This control process according to the present example embodiment is achieved in such a manner that the digital camera 100 loads a program recorded in the non-volatile memory 56 into the system memory 52, and the system control unit 50 executes the program. The flowchart for the control process in FIGS. 4A and 4B is started when the digital camera 100 is powered on and is in an image capturing standby state of an image capturing mode process in a moving image mode. In the present example embodiment, display control for performing display on the display unit 28 is employed. The present disclosure, however, is also applicable to a case where display is performed on the EVF 29 or an external monitor.

In step S401, the system control unit 50 acquires setting contents related to control of the digital camera 100 from the non-volatile memory 56 and also acquires current temperatures from the temperature sensors 91*a* to 91*c*. Specifically, in this step, the system control unit 50 acquires the setting contents related to moving image recording.

In step S402, the system control unit 50 determines whether the menu button 81 is pressed. In a case where the menu button 81 is pressed (YES in step S402), the processing proceeds to the procedures of the flowchart for the control process in FIG. 3, which is the menu mode process. In a case where the menu button 81 is not pressed (NO in step S402), the processing proceeds to step S403.

In step S403, the system control unit 50 determines whether the recording medium 200 is inserted in and attached to the digital camera 100. In a case where the recording medium 200 is inserted (YES in step S403), the processing proceeds to step S404. In a case where the recording medium 200 is not inserted (NO in step S403), the processing proceeds to step S406.

In step S404, the system control unit 50 acquires information regarding the memory card serving as the recording medium 200 inserted in the digital camera 100. In this step, the system control unit 50 can acquire the card standard for a Secure Digital (SD) card, a CFexpress card, or a CFast card, the specs, such as a writing speed to the card, the card manufacturing company name, and the product name.

In step S405, based on the setting contents acquired in step S401 and the information regarding the memory card acquired in step S404, the system control unit 50 determines whether a moving image can be recorded. In a case where a moving image can be recorded (YES in step S405), the processing proceeds to step S407. In a case where a moving image cannot be recorded (NO in step S405), the processing proceeds to step S406. Specifically, the case where a moving image cannot be recorded is as follows. Based on the settings related to moving image recording acquired in step S401 or the information regarding the inserted memory card acquired in step S404, the system control unit 50 determines that a remaining capacity of the memory card does not have sufficient capacity to start moving image recording, or the standard for or the specification of the memory card is not suitable for the digital camera 100, and thus, the current state does not match the current settings related to moving image recording. Also based on a charging state of the battery attached to the digital camera 100 or the temperatures measured by the temperature sensors 91*a* to 91*c*, the system control unit 50 determines whether a moving image can be recorded.

In step S406, the system control unit 50 displays a message on the display unit 28. The message provides the reason why the determination is NO in step S403 or S405. Examples of the message include "Card is not present" and "Remaining life of battery is running out".

In step S407, similarly to step S311, the system control unit 50 determines whether a moving image recording start instruction is issued. In a case where the moving image recording start instruction is issued (YES in step S407), the processing proceeds to step S408. In a case where the moving image recording start instruction is not issued (NO in step S407), the processing returns to step S401.

In step S408, the system control unit 50 starts recording of a moving image. That is, the system control unit 50 creates a moving image file in the recording medium 200 and records a moving image captured by the image capturing unit 22 with the current setting contents.

In step S409, the system control unit 50 references the non-volatile memory 56 and determines which of the automatic power-off temperatures is set. In a case where the automatic power-off temperature is set to "standard", which is the setting item 501 in FIG. 5A, the processing proceeds to step S410. In a case where the automatic power-off temperature is set to "high", which is the setting item 502 in FIG. 5A, the processing proceeds to step S411.

In step S410, the system control unit 50 determines whether the temperature measured by the temperature sensor 91*a* reaches the temperature limit. In a case where the temperature reaches the temperature limit (YES in step S410), the processing proceeds to step S412. In a case where the temperature does not reach the temperature limit (NO in step S410), the processing proceeds to step S411. The system control unit 50 determines whether the temperature measured by the temperature sensor 91*a*, i.e., the surface temperature of the exterior of the memory card, reaches the temperature limit. The temperature limit in this step is 70° C. In a case where the moving image recording format is set to the raw format, a temperature rise rate of the temperature sensor 91*a* is the highest among temperature rise rates of the temperature sensors 91*a*, 91*b*, and 91*c* during moving image recording. Thus, normally, the temperature measured by the temperature sensor 91*a* reaches the temperature limit before the temperatures measured by the temperature sensors 91*b* and 91*c* reach respective temperature limits each set for a corresponding one of the sensors. This is because, as described above, in a case where a moving image is recorded in the raw format, a large load is applied to the recording medium 200 in writing.

In step S411, the system control unit 50 determines whether the temperature measured by another temperature sensor reaches the temperature limit. In a case where the temperature reaches the temperature limit (YES in step S411), the processing proceeds to step S412. In a case where the temperature does not reach the temperature limit (NO in step S411), the processing proceeds to step S417. For example, the temperature measured by at least one of the temperature sensors 91*b* and 91*c* reaches 80° C., the determination is YES.

In step S412, the system control unit 50 stops the moving image recording. After stopping the moving image recording, the system control unit 50 performs a close process, such as assignment of attribute information, on a moving image file created in the recording medium 200. As described above, when the automatic power-off temperature setting is set to "standard", and in a case where the temperature measured by the temperature sensor 91*a* reaches the temperature limit, the system control unit 50 stops the moving image recording. Stopping the moving image recording can restrict an operation requiring the writing speed at a predetermined speed or higher, which is moving image recording with high image quality, for example. This can prevent the temperature of the recording medium 200 as the memory card from becoming high, and consequently, preventing the user from getting burned in a case where the user opens the cover 202 and inadvertently touches the recording medium 200. In a case where the determination is YES in step S410, a load may be applied to the memory card in the writing, and heat may be generated. As described above, in a case where high speed writing (transfer) to the memory card is the cause of a surface temperature rise of the memory card, imposing restriction on the operation requiring the writing speed at the predetermined speed or higher may be sufficient, and the recording of the moving image does not necessarily need to be stopped. That is, control can also be performed in such a manner that in a case where the determination is YES in step S410, instead of stopping the moving image recording, restricting the operation requiring the writing speed at the predetermined speed or higher by switching the recording format from the raw format to the MP4 format or changing the recording operation to low image quality moving image recording may be sufficient to continue the moving image recording. In the present example embodiment, the predetermined speed is 601 MB, for example. In a case where the determination is YES in step S411, since the temperature limit is set to avoid device breakdown, a decrease in image quality, or a low temperature burn, the highest priority is to lower the temperature as quickly as possible. Thus, control is performed to stop the moving image recording. On the other hand, in a case where it is determined in step S409 that the automatic power-off temperature is set to "high", the recording of the moving image is not stopped even in a case where the temperature measured by the temperature sensor 91*a* reaches the temperature limit. When the user sets the automatic power-off temperature setting to "standard", and in a case where the digital camera 100 records a moving image in the raw format at an environmental temperature of 23° C., the moving image can be recorded for about 15 to 20 minutes, and in a case where the digital camera 100 records a moving image in the raw format at an environmental temperature of 40° C., the moving image can be recorded for about 3 to 4 minutes, which may cause the user to feel inconvenience. Thus, to record a moving image for a longer time, the automatic power-off temperature setting is set to "high". Although the surface temperature of the exterior of the memory card may become higher than the temperature limit, there can be no problem unless the user immediately opens the cover 202. The possibility of a burn can be reduced as long as the user takes out the memory card by paying attention when taking out the memory card, takes out the memory card with gloves on, or takes out the memory card after a certain time elapses.

Figure 5B:
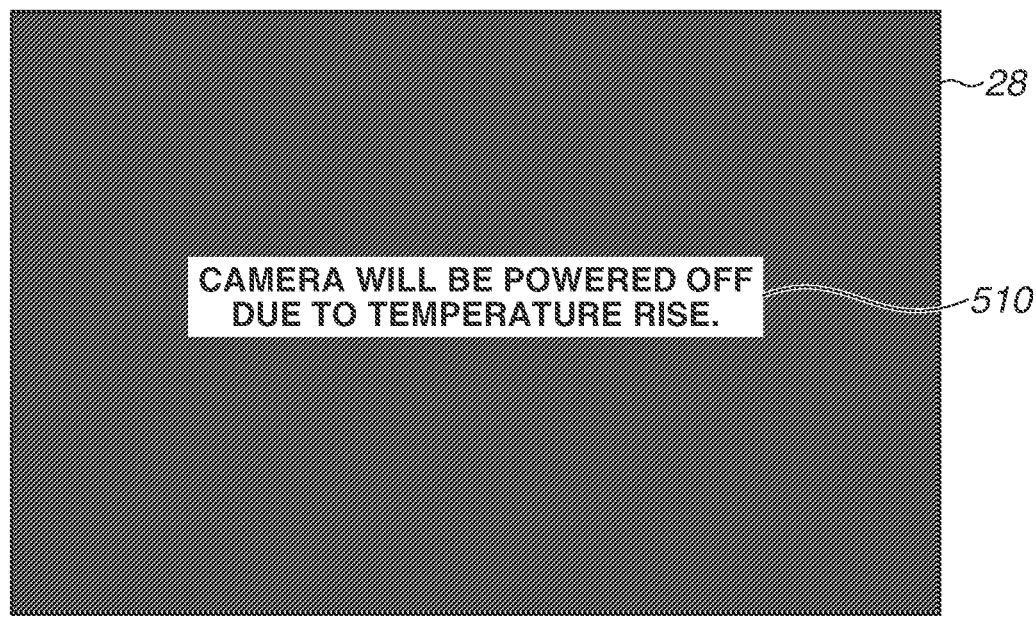
FIG. 5B is a diagram illustrating an example of display in a case where an operation is restricted in a moving image recording mode.

In step S413, the system control unit 50 displays a message 510 of "Camera will be powered off due to temperature rise" on the display unit 28. FIG. 5B illustrates an example of the display in this process. In FIG. 5B, the entire screen of the display unit 28 is blacked out after an LV image is tuned off, and the message 510 is displayed. In the present example embodiment, in a case where the recording of the moving image stops due to temperature, the highest priority is to lower the temperature as quickly as possible. Thus, the digital camera 100 is powered off. However, since the digital camera 100 is powered off not based on the user's intention, the user is notified by large display as illustrated in FIG. 5B that the digital camera 100 will be powered off, so that the user can view the display more easily. As described above in step S412, in a case where the temperature measured by the temperature sensor 91*a* reaches the temperature limit (YES in step S410), the moving image recording does not necessarily need to be stopped, or the digital camera 100 does not necessarily need to be powered off, and restricting the operation requiring the writing speed to the memory card at the predetermined speed or higher may be sufficient. Thus, in a case where the operation is restricted due to the temperature measured by the temperature sensor 91*a*, for example, control is performed to display a message notifying that the operation will be restricted, such as "Operation will be restricted due to rise in temperature of card". In the present example embodiment, the entire screen of the display unit 28 is blacked out after the LV image is turned off, and the message 510 is displayed, to power off the digital camera 100 because the temperature measured by the temperature sensor 91*a* reaches the temperature limit. However, the present invention is not limited to this configuration. However, in other embodiments, the message 510 may not be displayed in the entire screen of the display unit 28, and may be superimposed on the screen displaying image capturing information. Alternatively, an icon may be displayed together with the LV image.

In step S414, the system control unit 50 determines whether a predetermined time has elapsed. In a case where the predetermined time elapses (YES in step S414), the processing proceeds to step S415. In a case where the predetermined time has not elapsed (NO in step S414), the processing returns to step S414. The predetermined time according to the present example embodiment is about 5 seconds.

In step S415, the system control unit 50 hides the message displayed in step S413.

In step S416, the system control unit 50 powers off the digital camera 100, and the control procedure of the flowchart in FIGS. 4A and 4B ends. As described in step S413, in a case where the moving image recording stops due to temperature, the powering off lowers the temperature inside the digital camera 100 or the temperature of the exterior and the inside of the memory card faster than switching the operation mode of the digital camera 100 to the image capturing standby state. Thus, even in a case where a user operation is not performed, the system control unit 50 powers off the digital camera 100. In a case where the user operates the power switch 72, the system control unit 50 powers off the digital camera 100 even when the predetermined time has not elapsed in step S414.

In step S417, the system control unit 50 determines whether a moving image recording stop instruction is issued. In a case where the stop instruction is issued (YES in step S417), the processing proceeds to step S418. In a case where the stop instruction is not issued (NO in step S417), the processing returns to step S409. Specifically, the moving image recording stop instruction refers to pressing of the moving image button 76 or pressing of the shutter button 61. In a case where the shutter button 61 is pressed while moving image recording is not performed, the operation mode of the digital camera 100 transitions to the still image standby state in the image capturing mode process. However, in a case where the shutter button 61 is pressed while moving image recording is performed, the moving image recording is stopped.

In step S418, similarly to step S412, the system control unit 50 stops the moving image recording.

In step S419, the system control unit 50 determines whether the image capturing standby state ends. For example, in a case where the image capturing standby state ends due to the powering off (YES in step S419), the control procedure of the flowchart in FIGS. 4A and 4B ends. In a case where the image capturing standby state does not ends (NO in step S419), the processing returns to step S401.

In the present example embodiment, the automatic power-off temperature setting is provided as the setting of whether to power off the digital camera 100 in a case where the temperature measured by the temperature sensor 91*a* reaches the temperature limit as the predetermined temperature. However, the control is not limited to the powering off. The control can also be performed in such a manner that in a case where the temperature reaches the predetermined temperature, and when moving image recording is performed, the moving image recording is stopped, and when it is not during moving image recording, the digital camera 100 is powered off. In addition to moving image recording, continuous recording of the still images may be also stopped in a case where the temperature reaches the predetermined temperature during the continuous recording of still images.

In addition to moving image recording in the digital camera 100, an operation responsible for a rise in the temperature of the recording medium 200 (the temperature measured by the temperature sensor 91*a*) can also be restricted. For example, in a case where a recording medium (a memory card) is attached to a communication device, such as a smartphone, and in a case where the temperature of the recording medium rises, an operation is restricted. When a photograph or an application saved in the recording medium is backed up on a cloud via the Internet, and in a case where the temperature of the recording medium rises, the backup is temporarily stopped. The backup from the recording medium to the cloud may be performed based on a user instruction, or may be periodically automatically performed, or may be automatically started according to an operation in which a wireless connection (WiFi) is established. Not only when the backup to the cloud is performed, but also when backup from internal storage of the smartphone to a memory card (an external storage) attached to the smartphone is performed, the backup is also stopped in a case where the temperature of the card rises.

In the present example embodiment, a dedicated temperature sensor provided in an insertion opening of the recording medium 200 for measuring and acquiring the surface temperature of the recording medium 200 is included in the digital camera 100, and control is performed according to the temperature acquired by the temperature sensor. The control, however, is not limited to this. As described above, the control can also be similarly performed by acquiring the temperature acquired by a temperature sensor for measuring the internal temperature of the recording medium 200 via a recording medium I/F, and in a case where the internal temperature of the recording medium 200 reaches a predetermined temperature, controlling of the device may be performed according to a user setting.

As described above, in the present example embodiment, the temperature of the recording medium 200 attached to the digital camera 100 is measured, and the operation of the digital camera 100 is controlled according to the setting (the selection) of the user.

In a case where a setting for restricting the operation of the digital camera 100 when the temperature of the recording medium 200 reaches a predetermined temperature as a temperature limit is performed, an operation requiring the writing speed to the recording medium 200 at a predetermined speed is restricted. By such control, it is possible to prevent the situation where a user is surprised by heat and drops the recording medium 200 or gets burned when inadvertently taking out the recording medium 200. In a case where a setting for not restricting the operation of the digital camera 100 when the temperature of the recording medium 200 reaches the predetermined temperature is set, the operation requiring the writing speed to the recording medium 200 at the predetermined speed or higher is not restricted. By such control, it is possible to reduce the loss of an image capturing opportunity due to the restriction of the operation such as the stop of the recording of a moving image against the user's intention, or a decrease in the recording format or image quality.

The various types of control performed by the system control unit 50 in the description may be performed by a single piece of hardware, or the processing may be shared by a plurality of pieces of hardware (e.g., a plurality of processors or circuits), to control the entire apparatus.

While example embodiments have been described, the present invention is not limited to these specific example embodiments. Embodiments of the present invention can also include various variations without departing from the spirit and scope of the invention. Further, the above example embodiments merely illustrate examples of the present invention, and can also be appropriately combined together to form additional embodiments of the present invention.

In the above example embodiments, as an example, an embodiment has been described where the present disclosure is applied to the digital camera 100. The present invention, however, is not limited to this example, and is applicable, for example, to any electronic device capable of measuring a surface temperature of a recording medium inserted in and attached to the electronic device. That is, the present invention could be used in a personal computer, an external monitor, a mobile phone terminal, a mobile image viewer, a music player, or a game apparatus, for example.

In addition, the present invention is applicable not only to an imaging apparatus main body but also to a control apparatus that communicates with an imaging apparatus (including a network camera) through wired or wireless communication and remotely controls the imaging apparatus main body. Examples of the apparatus that remotely controls the imaging apparatus include apparatuses such as a smartphone, a tablet personal computer (PC), and a desktop PC. Based on operations performed in the control apparatus or processes performed in the control apparatus, the control apparatus notifies the imaging apparatus of commands to perform various operations and various settings and thereby can remotely control the imaging apparatus. The control apparatus may be able to receive a live view image captured by the imaging apparatus through wired or wireless communication and display the live view image.

Other Example Embodiments

According to another embodiment of the present disclosure, software (a program) is supplied for achieving the functions of the above example embodiments in a system or an apparatus, via a network or various storage media, and of causing a computer (or a central processing unit (CPU) or a microprocessor unit (MPU)) of the system or the apparatus to read and execute program code. In this case, the program and a storage medium that stores the program constitute an embodiment of the present disclosure.

According to various embodiments of the present disclosure, it is possible to perform recording in a recording medium for a longer time according to a selection of a user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2021-003493, filed Jan. 13, 2021, which is hereby incorporated by reference herein in its entirety.

What is claimed is:

1. An electronic device comprising at least one memory and at least one processor which function as:
   a temperature acquisition unit configured to acquire a temperature of a recording medium used in the electronic device;
   a setting unit configured to set at least one of settings including a first setting and a second setting; and
   a control unit configured to perform control, in a case where the first setting is set, and when a predetermined condition regarding a rise in the temperature of the recording medium is satisfied, to restrict at least a particular operation requiring a writing speed to the recording medium at a predetermined speed or higher, and in a case where the second setting is set, not to restrict the particular operation even when the predetermined condition is satisfied.

2. The electronic device according to claim 1, wherein the particular operation is moving image recording.

3. The electronic device according to claim 1, wherein the particular operation is at least one of moving image recording with an image quality higher than a predetermined image quality, moving image recording at a frame rate where a frame rate for recording is higher than a predetermined number of frames, and moving image recording in a recording format that is a predetermined format.

4. The electronic device according to claim 1, wherein the particular operation is at least one of moving image recording with an image quality higher than full high definition (FHD), moving image recording at a frame rate where a frame rate for recording is higher than 119 frame per second (fps), and moving image recording in a recording format that is a raw format.

5. The electronic device according to claim 1, wherein the temperature acquisition unit is a temperature sensor configured to measure the temperature of the recording medium and is disposed in an attachment opening of the recording medium.

6. The electronic device according to claim 1, wherein the predetermined condition includes a state where the temperature of the recording medium acquired by the temperature acquisition unit reaches a predetermined temperature.

7. The electronic device according to claim 6, wherein the predetermined temperature is 70° C.

8. The electronic device according to claim 6, wherein the predetermined condition includes at least one of a state where a moving image recording format for moving image recording using the electronic device is set to a raw format, a state where the recording medium is not Type B of a CFexpress card, and a state where a transfer speed of the recording medium is less than 600 MB/second.

9. The electronic device according to claim 1, wherein the first setting is a setting, in a case where the predetermined condition is satisfied, to power off the electronic device.

10. The electronic device according to claim 1, wherein the second setting is a setting, even in a case where the predetermined condition is satisfied, to not power off the electronic device.

11. The electronic device according to claim 1, wherein the first setting and the second setting are set in advance for the setting unit by a user.

12. The electronic device according to claim 1, wherein in a case where the second setting is set by a user, the control unit controls a display unit to perform display notifying the user not to inadvertently open a cover of a portion where the recording medium is stored.

13. The electronic device according to claim 1, wherein the control unit performs control, in a case where the recording medium is not attached to the electronic device, to restrict execution of an operation requiring the writing speed to the recording medium at the predetermined speed or higher regardless of a content of a setting set in the setting unit.

14. The electronic device according to claim 1, further comprising:
   an image capturing unit,
   wherein the control unit performs control, when a video captured by the image capturing unit is recorded in the recording medium, and the temperature of the recording medium acquired by the temperature acquisition unit satisfies the predetermined condition while the video is recorded, and in a case where the first setting is set, to restrict an operation requiring the writing speed to the recording medium at the predetermined speed or higher, and in a case where the second setting is set, not to restrict the operation requiring the writing speed to the recording medium at the predetermined speed or higher.

15. The electronic device according to claim 1, further comprising:
   a recording medium interface to which a CFexpress card can be attached,
   wherein the control unit performs control to perform writing to the CFexpress card attached to the recording medium interface.

16. The electronic device according to claim 1, wherein the setting unit sets the at least one of the settings including the first setting and the second setting in accordance with an operation by a user.

17. The electronic device according to claim 1, wherein the control unit performs control, even when the predetermined condition is satisfied, not to restrict the particular operation, and when a second condition regarding a rise in a temperature of a member, which is different from the recording medium and is used in the electronic device, is satisfied, to restrict the particular operation.

18. The electronic device according to claim 17, wherein the electronic device is an imaging apparatus including an image capturing unit and the member is the image capturing unit.

19. The electronic device according to claim 18, further comprising:
   a second temperature acquisition unit configured to acquire a temperature of the image capturing unit,
   wherein the control unit performs control, in a case where the first setting is set, and when the temperature of the recording medium acquired by the temperature acquisition unit reaches a first temperature, to restrict the particular operation, and in a case where the second setting is set, not to restrict the particular operation even when the temperature of the recording medium acquired by the temperature acquisition unit reaches the first temperature, and when the temperature of the image capturing unit acquired by the second temperature acquisition unit reaches a second temperature, to restrict the particular operation.

20. The electronic device according to claim 18, wherein the particular operation is an operation causing the rise in the temperature of the recording medium to be higher than the rise in the temperature of the image capturing unit.

21. The electronic device according to claim 19, wherein the second temperature is higher than the first temperature.

22. The electronic device according to claim 1, wherein the control unit performs control to restrict the particular operation and power off the electronic device.

23. A method for controlling an electronic device, the method comprising:
   acquiring a temperature of a recording medium used in the electronic device;
   setting at least one of settings including a first setting and a second setting; and
   performing control, in a case where the first setting is set, and when a predetermined condition regarding a rise in the temperature of the recording medium is satisfied, to restrict at least a particular operation requiring a writing speed to the recording medium at a predetermined speed or higher, and in a case where the second setting is set, not to restrict the predetermined operation even when the predetermined condition is satisfied.

24. A computer-readable non-transitory recording medium storing a program for causing a computer to function as the steps of the method for controlling the electronic device according to claim 23.

* * * * *